(12) United States Patent
Tuthill et al.

(10) Patent No.: US 10,731,379 B2
(45) Date of Patent: Aug. 4, 2020

(54) FENCE POST FOR AN ANIMAL ENCLOSURE

(71) Applicant: Hebe Studio Ltd., Oxfordshire (GB)

(72) Inventors: James Tuthill, Oxford (GB); Johannes Paul, London (GB); Simon Nicholls, Northamptonshire (GB); William Windham, Banbury (GB)

(73) Assignee: HEBE STUDIO LTD, Oxforshire (GB)

( * ) Notice: Subject to any disclaimer, the term of this patent is extended or adjusted under 35 U.S.C. 154(b) by 453 days.

(21) Appl. No.: 15/613,345

(22) Filed: Jun. 5, 2017

(65) Prior Publication Data

US 2017/0350159 A1     Dec. 7, 2017

(30) Foreign Application Priority Data

Jun. 3, 2016     (GB) ...................................... 1609760

(51) Int. Cl.
*E04H 17/02*     (2006.01)
*E04H 17/22*     (2006.01)
(Continued)

(52) U.S. Cl.
CPC ........... *E04H 17/22* (2013.01); *A01K 1/0005* (2013.01); *E04H 12/223* (2013.01);
(Continued)

(58) Field of Classification Search
CPC ......... E04H 17/20; E04H 17/22; E04H 17/24; E04H 12/18; E04H 12/223; E04H 17/161; E04H 17/18; E04H 12/2223; A01K 1/0005
See application file for complete search history.

(56) References Cited

U.S. PATENT DOCUMENTS 3,370,834 A * 2/1968 Reznicek ................. H05C 1/00
                                                        256/10
3,911,548 A * 10/1975 Perry ....................... H02G 1/02
                                                       29/402.12
(Continued)

FOREIGN PATENT DOCUMENTS

AT     394600 B  *  5/1992  ............. E04D 13/10
CH     658105 A5 * 10/1986  .......... E04F 11/1817
(Continued)

OTHER PUBLICATIONS

Intellectual Property Office of the United Kingdom, Search Report issued in Application No. GB1609760.2, dated Nov. 14, 2016.

*Primary Examiner* — Matthew R McMahon
(74) *Attorney, Agent, or Firm* — Taft Stettinius & Hollister LLP; Stephen F. Rost

(57) ABSTRACT

A fence post for an animal enclosure including a first member, a second member, a collar, and a fastener. The first member and second member are substantially the same length. The second member has a cross-bore at a proximal end thereof, the collar defines an aperture, and the first member is fixedly attachable to the collar. The second member is configured to be partially received within the collar for alignment of the cross-bore and the aperture, and the second member is fixable relative to the collar by means of the fastener arranged to at least partially passthrough said cross-bore and said aperture.

17 Claims, 5 Drawing Sheets

(51) Int. Cl.
*E04H 17/18* (2006.01)
*A01K 1/00* (2006.01)
*E04H 12/22* (2006.01)
*E04H 17/16* (2006.01)
*E04H 12/18* (2006.01)
*E04H 17/20* (2006.01)
*E04H 17/24* (2006.01)

(52) U.S. Cl.
CPC .......... *E04H 12/2223* (2013.01); *E04H 17/18* (2013.01); *E04H 12/18* (2013.01); *E04H 17/161* (2013.01); *E04H 17/20* (2013.01); *E04H 17/24* (2013.01)

(56) References Cited

U.S. PATENT DOCUMENTS

| | | | | |
|---|---|---|---|---|
| 3,951,436 A | * | 4/1976 | Hyde, Jr. | F16L 25/08 285/27 |
| 4,091,523 A | * | 5/1978 | Riecke | F16L 25/08 29/525.11 |
| 4,621,783 A | * | 11/1986 | Wier | A47B 57/56 174/163 F |
| 5,375,801 A | * | 12/1994 | Porter | E04H 12/2215 248/156 |
| 5,395,093 A | * | 3/1995 | Chrisman | E04H 12/2215 256/47 |
| 5,661,946 A | * | 9/1997 | Davis | E04H 12/04 248/219.2 |
| 5,782,040 A | * | 7/1998 | McCartan | E01F 9/635 345/690 |
| 6,264,162 B1 | * | 7/2001 | Barnes | E01F 9/635 248/548 |
| 6,527,246 B1 | * | 3/2003 | Stinnett | F16L 1/06 248/530 |
| 6,715,803 B1 | * | 4/2004 | Pahl | F16B 7/1472 285/145.1 |
| 7,438,324 B2 | * | 10/2008 | Keiper | B23D 77/00 285/31 |
| 7,883,338 B2 | * | 2/2011 | Smith | H01R 4/60 439/33 |
| 7,930,859 B1 | * | 4/2011 | Eslambolchi | E01F 9/629 248/159 |
| 10,077,893 B1 | * | 9/2018 | Abraham | F21V 33/0052 |
| 10,329,793 B2 | * | 6/2019 | Nelson | A01K 3/00 |
| 2008/0001134 A1 | * | 1/2008 | Coley | E04H 17/10 256/1 |
| 2009/0183465 A1 | | 7/2009 | Park | |
| 2017/0101803 A1 | * | 4/2017 | Arik | E04H 17/08 |
| 2017/0247910 A1 | * | 8/2017 | Nelson | A01K 3/00 |

FOREIGN PATENT DOCUMENTS

| | | | | |
|---|---|---|---|---|
| EP | 284283 A2 | 9/1988 | | |
| GB | 2132305 A | 7/1984 | | |
| GB | 2439546 A | * 1/2008 | ............ | E04H 17/20 |
| WO | 02/095153 A1 | 11/2002 | | |

\* cited by examiner

FENCE POST FOR AN ANIMAL ENCLOSURE

RELATED APPLICATIONS

The present application claims priority to United Kingdom Patent Application Ser. No. 1609760.2, filed Jun. 3, 2016, the disclosure of which is hereby incorporated by reference in its entirety.

FIELD

One aspect of this disclosure relates to a fence post for an animal enclosure; particularly but not exclusively to a two-part fence post that comprises a first member, a second member and a fastening arrangement for coupling the first and second members together. Another aspect of the disclosure relates to an enclosure for animals that includes one or more of the aforementioned fence posts.

BACKGROUND

Fence posts have previously been used to support metal or plastic wire netting in order to provide enclosures for livestock such as chickens, ducks and pheasants. As such livestock benefit from grazing in different areas, it is preferable for the fence posts to be movable so that the enclosure can be re-sited in alternate locations. It is also preferable that the fence posts have a lightweight structure.

Known fence posts are often of a solid, wood or metal construction and are therefore relatively heavy. They also tend to be cumbersome and require considerable storage space. Another problem with such posts is that when mailed to customers, shipping and courier costs are increased due to their considerable weight and volume.

The present disclosure has been devised with the foregoing problems in mind. An aim of one implementation of the teachings of the disclosure is to provide a fence post that is compact before final assembly, that is efficient, reliable, lightweight and which may be produced at relatively low cost.

SUMMARY

In accordance with one embodiment of the present disclosure, there is provided a two-part fence post comprising a first member, a second member and a fastening arrangement for coupling the first and second members together.

The first member and second member may be substantially the same length.

The second member may have a cross-bore at a proximal end thereof.

The fastening arrangement for coupling the two members may include a collar and a fastener.

The second member may have a cross-bore at a proximal end thereof, the collar may have an aperture.

The first member may be fixedly attached to the collar.

The second member may be configured to be partially received within the collar so as to align the cross-bore and the aperture.

The second member may be fixable relative to the collar by means of the fastener arranged to at least partially pass through said cross-bore and said aperture.

Provision of the fence post as a two-part structure allows the fence post to be packaged and stored in a shorter container prior to assembly. Providing the first member and second member at substantially the same length allows the container size to be optimised for compactness.

The first member may be partially received within the collar.

The first member may be fixedly attached to the collar by means of an adhesive. Alternatively, or additionally a mechanical fastener may be used.

The first member may be the upper member and the second member may be the lower member. In this arrangement, in combination with the use of adhesive, a water-proof seal can be provided to prevent water ingress into the fence post, which water ingress may otherwise weather the fence post materials (either by freeze-thaw action and/or corrosion) or destabilise the fence post.

The collar may include an end-stop. As the first member may be received within the collar, this arrangement prevents over-insertion of the first member during manufacture. Furthermore, the use of jigs, tools or measurement equipment is not necessary to ensure correct insertion of the first member within the collar. Furthermore, as the second member may similarly be received within the collar, this arrangement ensures the vertical alignment of the bore and aperture.

The end-stop may be provided at a collar longitudinal mid-point. This arrangement provides an optimally balanced fence post assembly.

The end-stop may be a dimple. By altering the collar form using a surface process, no extra components are required to provide the end-stop and thus the cost, weight and complexity of the fence post assembly is reduced.

The first member may further comprise a hook for attaching a fence, the hook being arranged at a distal end of the first member.

The second member may further comprise a foot, the foot being arranged at a distal end of the second member. The foot may terminate in a spike. This arrangement allows easy insertion of the fence post into the ground.

The hook may define a fence plane and may include an aperture that may be aligned with the fence plane. The foot may include a side-foot, the side-foot extending with a dog leg cross-brace, extending perpendicularly relative to the cross-bore and the aperture. This arrangement provides a foot step to facilitate insertion of the fence post into the ground. Furthermore, arranging the dog leg cross-brace to extend perpendicularly relative to the cross-bore and the aperture ensures that the foot step provided by the dog leg cross-brace does not interfere with the fence plane.

The side-foot may also terminate in a spike. This further facilitates insertion of the fence post into the ground.

The fastener may comprise a screw. The screw may be self-tapping. The first member and or second member and or collar may be tubular.

The first and or second member may be made of fibreglass. The collar may be made of metal.

According to a second aspect of the present disclosure there is provided an enclosure assembly comprising a net fence and at least one fence post as hereinbefore described. The reticulated fence may be of metal or plastics.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

DETAILED DESCRIPTION

Figure 1:
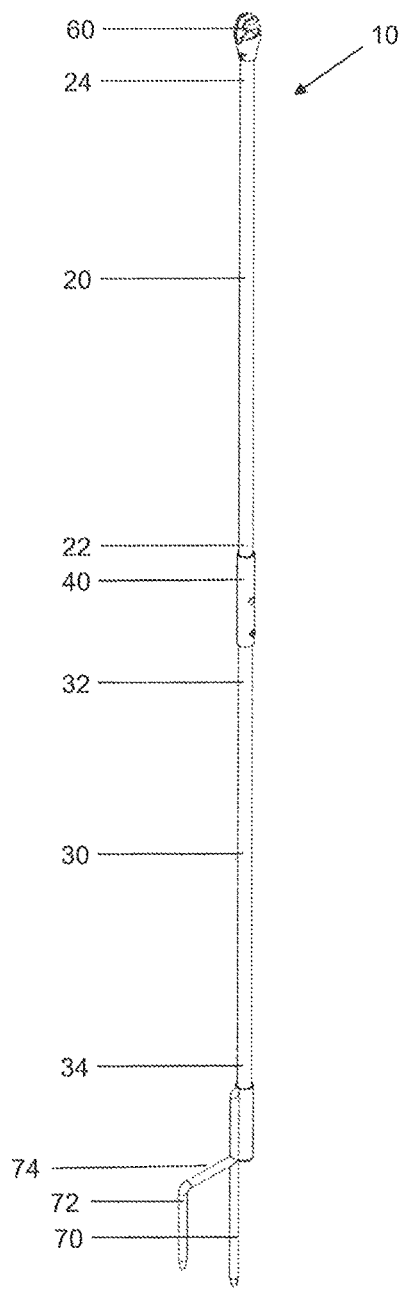
FIG. 1 is a perspective view of an assembled fence post.
Figure 2:
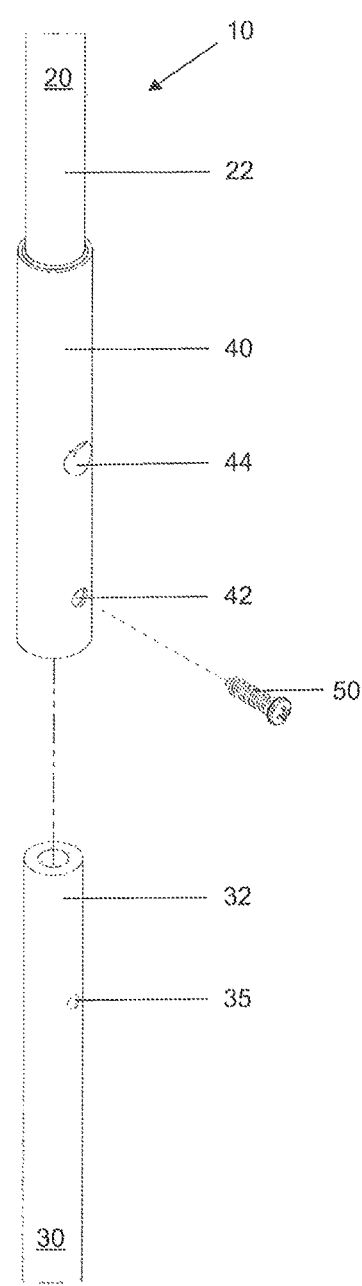
FIG. 2 is an enlarged exploded view of the fence post of FIG. 1.
Figure 3:
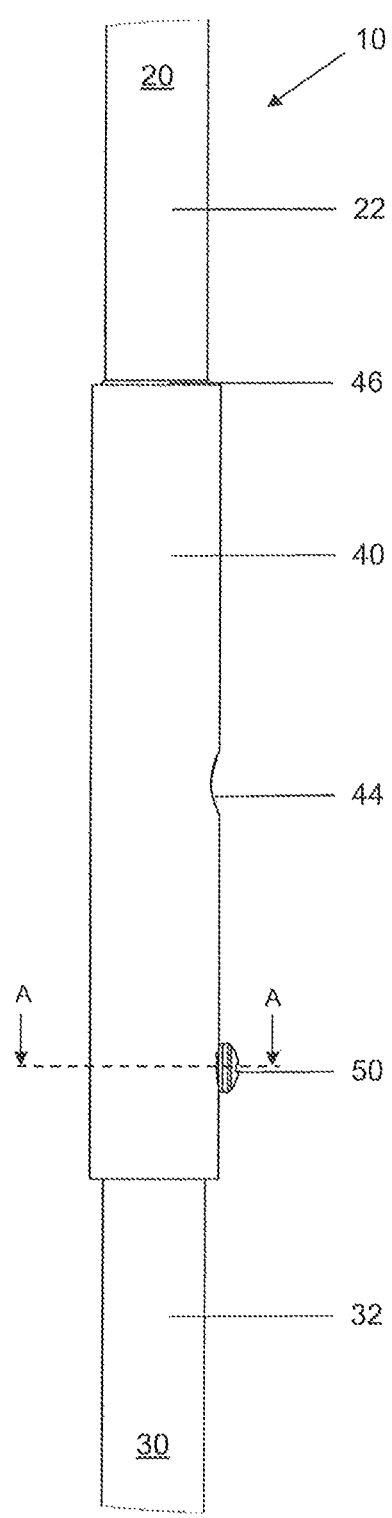
FIG. 3 is an enlarged side elevation of the assembled fence post of FIG. 1 showing an attachment region.
Figure 4:
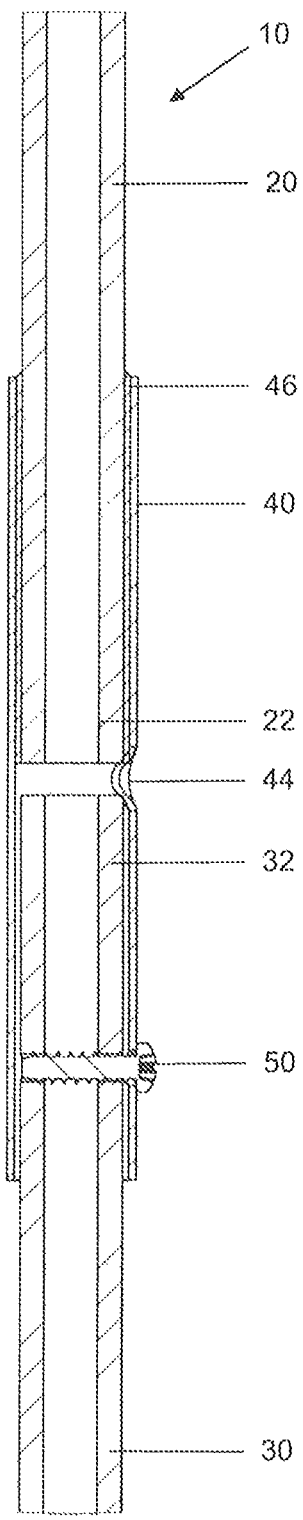
FIG. 4 is a vertical cross section of the fence post attachment region of FIG. 3.
Figure 5:
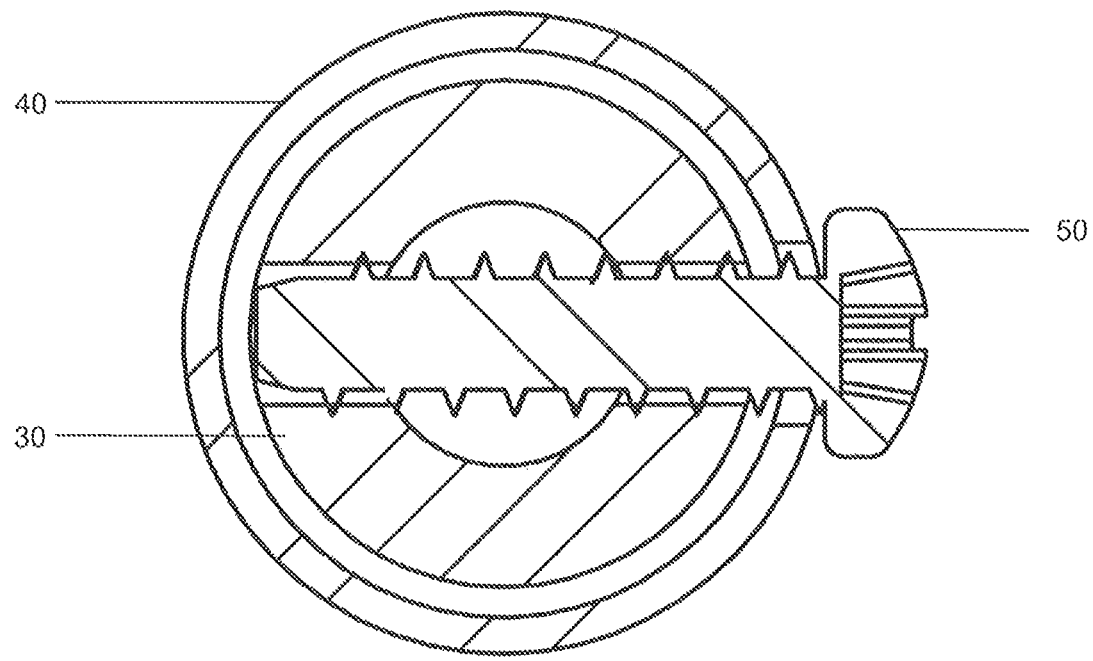
FIG. 5 is a horizontal cross section of the fence post attachment region of FIG. 3 taken at line A-A.

One implementation of the teachings of the present disclosure will now be described with reference to FIGS. 1 to 5 of the accompanying drawings, in which there is schematically depicted a two-part fence post 10. The two-part fence post 10 has a first member 20 and a second member 30. The first and second members 20, 30 are substantially the same length. The first and second members 20, 30 have an annular cross-section and are tubular in form.

The fence post 10 (see FIGS. 1 and 2) is assembled by coupling the first member 20 and second member 30 together by means of a fastening arrangement that comprises a collar 40 and a fastener 50.

The collar 40 is tubular in form with an annular cross-section. An end-stop is provided at the longitudinal mid-point of the collar 40. The end-stop is in the form of a dimple 44 made in the sidewall of the collar 40. In one embodiment, the fastener 50 is a self-tapping screw, but other forms of self-tapping fasteners may be used without departing from the spirit and scope of the present disclosure.

The first member 20 has a proximal end 22 and a distal end 24. Similarly, the second member 30 has a proximal end 32 and a distal end 34. The terms proximal and distal are used in relation to the fastening arrangement.

As shown the first member 20 forms an upper member of the fence post, and the second member forms a lower member 30 of the fence post.

The first member 20 is further provided with a connector, in the illustrated embodiment a hook 60, for attaching the first member to a fence. The hook 60 is arranged at the distal end 24 of the first member 20.

The second member 30 is further provided with a foot 70 for locating and fixing the fence post 10 in the ground. The foot 70 is arranged at the distal end 34 of the second member. In this embodiment the foot terminates in a spike or other ground engaging member. The foot 70 includes a side-foot 72 extending with a dog leg cross brace 74, and terminating in a spike extending substantially in parallel with the spike of the foot 70.

The second member 30 has a cross-bore 35 adjacent the proximal end 32. An aperture 42 is defined in a sidewall of the collar 40, adjacent the end thereof that couples to the proximal end of the second member (which end will be the lower end, in use).

To assemble the fence post, the proximal end 22 of the first member 20 is covered in an adhesive 46. As shown best in FIGS. 2 to 4, the adhesive covered proximal end 22 of the first member 20 is then inserted into an end of collar 40 furthest from the aperture 42 (the upper end, in use) until the first member abuts the end stop provided by the dimple 44. The adhesive 46 cures to fixedly attach the first member 20 to the collar 40. Furthermore, the cured adhesive 46 forms a waterproof seal at the tip of the collar 40.

The proximal end 32 of the second member 30 is the inserted into the opposite end (the lower end, in use) of collar 40 until it abuts the end stop provided by dimple 44. The second member 30 is pivoted in this position until the cross-bore 35 is aligned with the aperture 42.

The fastener 50 may then be inserted into the aperture 42 and cross-bore 35. The self-tapping screw cuts a thread in a wall of the second member 30 defining the cross-bore 35 and secures the second member 30 relative to the collar 40, (see FIG. 5).

Figure 6:
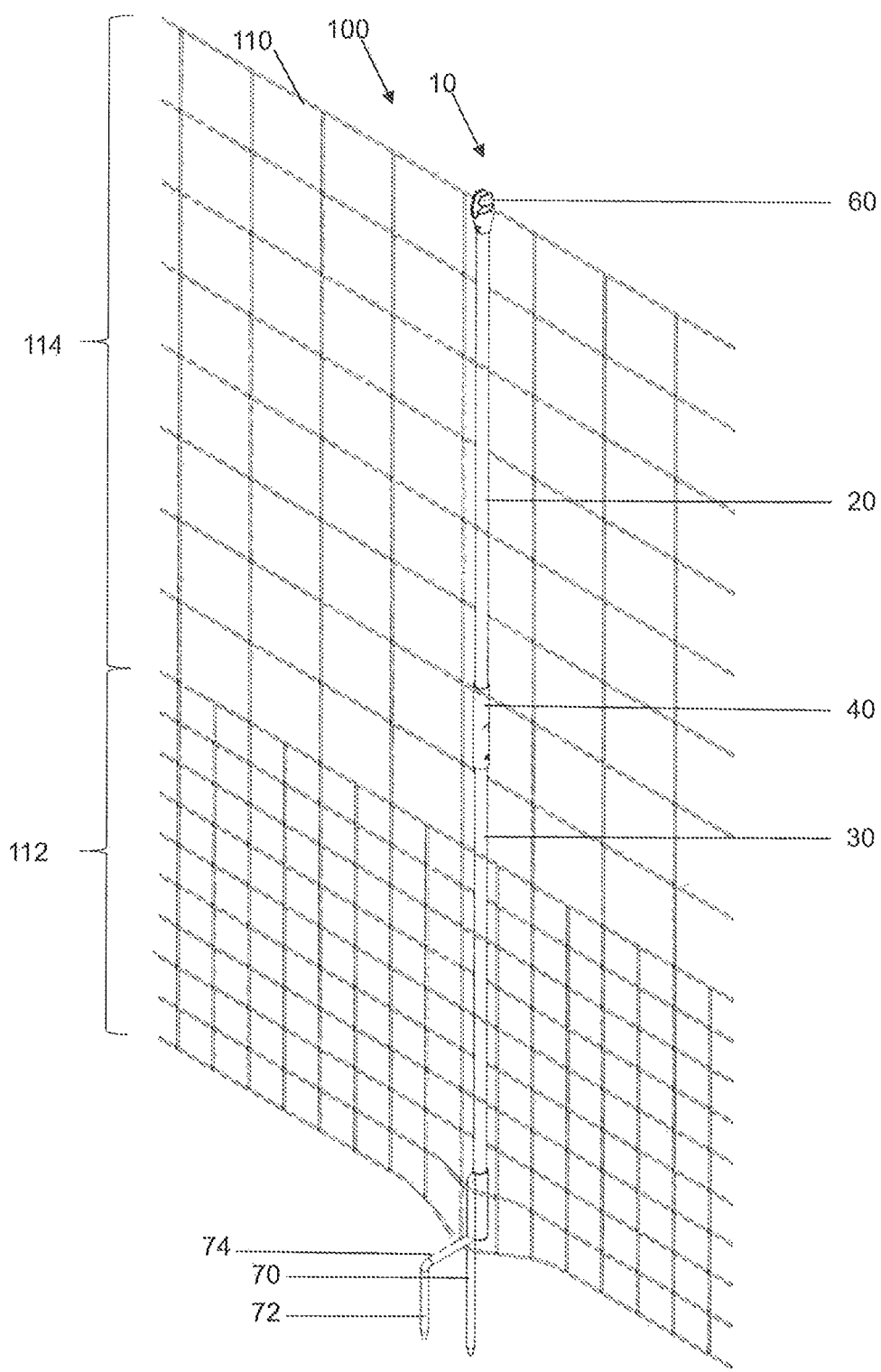
FIG. 6 is a perspective view of the assembled fence post of FIG. 1 with a net fence forming an enclosure assembly.
Figure 7:
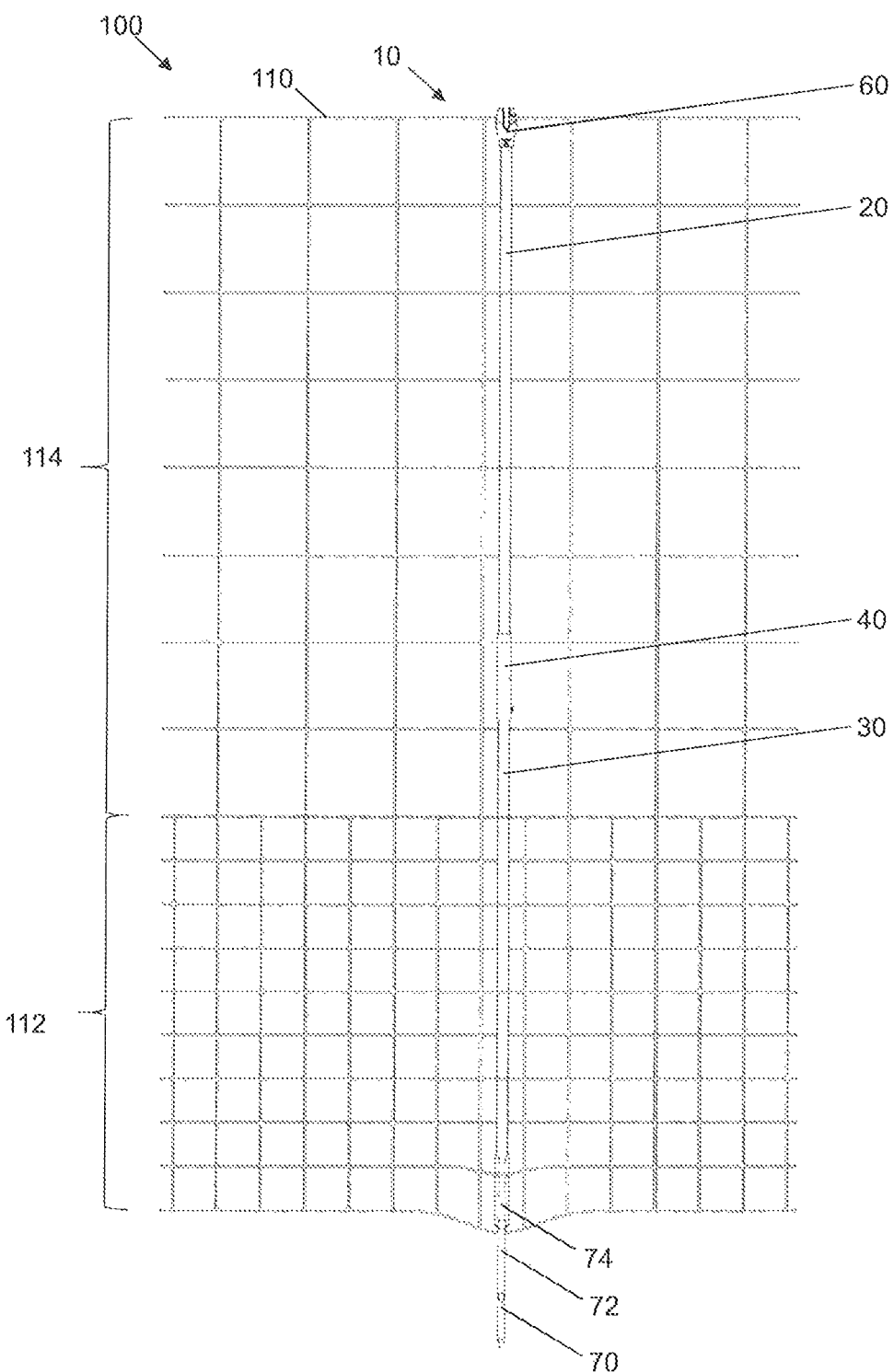
FIG. 7 is a side elevation of the enclosure assembly of FIG. 6.

An enclosure assembly 100 is shown in FIGS. 6 and 7. The enclosure comprises a fence post 10 and a fence 110 comprising a reticulated mesh. In this instance the fence comprises a wire mesh, but it will be appreciated that it may equally be of plastics. The fence 110 has a lattice structure comprising horizontally and vertically extending wires, together extending in a fence plane. In this particular embodiment, the wire fence 110 has a more densely arranged lattice structure in a lower region 112 and a less densely arranged latter structure in an upper region 114.

The assembled fence post 10 is arranged such that the lowermost horizontally extending wire is hooked under the dog leg cross brace 74, between the foot 70 and side-foot 72. Subsequent horizontally extending wires are thread on alternate sides of the fence post 10. The uppermost horizontally extending wire is then hooked over the hook 60. The fence post 10 and wire fence 110 are sized so as to keep the wire fence 110 relatively taught.

The enclosure 100 may be assembled in an alternate order. For example, the second member 30 may be partially inserted into the ground using the foot 70, without engaging the side-foot 72 with the ground. The wire fence 110 may then be partially threaded over the second member 30, with a lower end of the wire fence 110 looped under the side-foot 72. The second member 30 may then be fully inserted into the ground such that the side-foot 72 cross-brace 74 is level with the ground. The first member 20 may then be threaded through the remainder of the wire fence 110. The first member 20 is then connected to the second member by placing the collar 40 over the second member 30 and inserting the fastener 50.

In the exemplary embodiment the first member and second member are made of extruded fibreglass. The collar is made of metal. The use of other suitable and lightweight materials is envisaged. In alternate embodiments the first member and second member may be of plastics or metal material.

In the exemplary embodiment, the first member is fixed to the collar by adhesive. In an alternate embodiment the first member may be fixed to the collar by means of a second fastening arrangement in the same manner as used to join the collar and the second member. This second fastening arrangement may be provided instead of, or in addition to the adhesive.

In the exemplary embodiment, wire-mesh netting is described, however other similar lightweight fencing material may be used.

It will be appreciated that whilst various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims. For example, while one embodiment described herein discloses a two-part fence post, it will be apparent to persons of ordinary skill in the art that the teachings of the disclosure may readily be applied to fence posts having more than two parts. For example, the fence post could comprise three members, a first two of which are coupled together by a first collar before the third is coupled to the coupled first and second members by means of a second collar. As such, references herein to two-part fence posts should not necessarily be construed as limiting the scope of the disclosure only to fence posts having two parts.

It should also be noted that while the accompanying claims set out particular combinations of features described herein, the scope of the present disclosure is not limited to the particular combinations hereafter claimed but instead extends to encompass any combination of features herein disclosed.

Finally, it should be noted that any element in a claim that does not explicitly include the word "means" or explicitly state "means for" performing a specified function, or "steps for" performing a specific function, is not to be interpreted as a "means" or "step" clause as specified in 35 U.S.C. Sec. 112, par. 6. In particular, any use of "step of" in the claims appended hereto is not intended to invoke the provisions of 35 U.S.C. Sec. 112, par. 6.

The invention claimed is:

1. A fence post comprising:
a first member,
a second member,
a collar including a sidewall; and
a fastener,
wherein the first member and second member are substantially the same length, the second member having a cross-bore at a proximal end thereof, the sidewall defining a single sidewall aperture and lacking any additional apertures in the sidewall, and wherein the first member is fixedly attachable to the collar, wherein the cross-bore includes a first aperture and second aperture, and the second member is configured to be partially received within the collar for alignment of the first aperture and second aperture of the cross-bore and the sidewall aperture, the second member being fixable relative to the collar by means of the fastener arranged to pass through the first aperture and the second aperture of said cross-bore and said sidewall aperture of said collar.

2. A fence post according to claim 1, wherein the first member is partially received within the collar.

3. A fence post according to claim 2 including an adhesive, wherein the first member is fixedly and sealably attachable to the collar by the adhesive, wherein the adhesive is only located at one end of the collar.

4. A fence post according to claim 3, wherein, in use the first member forms an upper part of said fence post and the second member forms a lower part of said fence post, and the adhesive is only located at the first member and not the second member.

5. A fence post according to claim 1, wherein, in use the first member forms an upper part of said fence post and the second member forms a lower part of said fence post.

6. A fence post according to claim 1, wherein the collar includes an end-stop.

7. A fence post according to claim 6, wherein the end-stop is provided at a collar longitudinal mid-point.

8. A fence post according to claim 7, wherein the end-stop comprises a formation extending into a bore defined by said collar, the formation including a dimple.

9. A fence post according to claim 1, wherein the first member further comprises a connector for coupling to a fence, the connector being arranged at a distal end of the first member.

10. A fence post according to claim 9, wherein the second member further comprises a foot, the foot being arranged at a distal end of the second member.

11. A fence post according to claim 10, wherein said connector defines a fence plane and said sidewall aperture is aligned with the fence plane, and wherein said foot includes a side-foot, the side foot extending perpendicularly relative to the cross-bore and the sidewall aperture.

12. A fence post according to claim 1, wherein the fastener comprises a screw.

13. A fence post according to claim 12, wherein the screw, is self-tapping.

14. A fence post according to claim 1, wherein the first member or second member and/or collar are tubular.

15. A fence post according to claim 1, wherein the first or second member are made of fibreglass.

16. A fence post according to claim 1, wherein the collar is made of metal.

17. An enclosure assembly comprising a net fence and at least one fence post according to claim 1, said fence post being releasably connectable to said net fence.

* * * * *